Figures 1, 2, 3, 4:
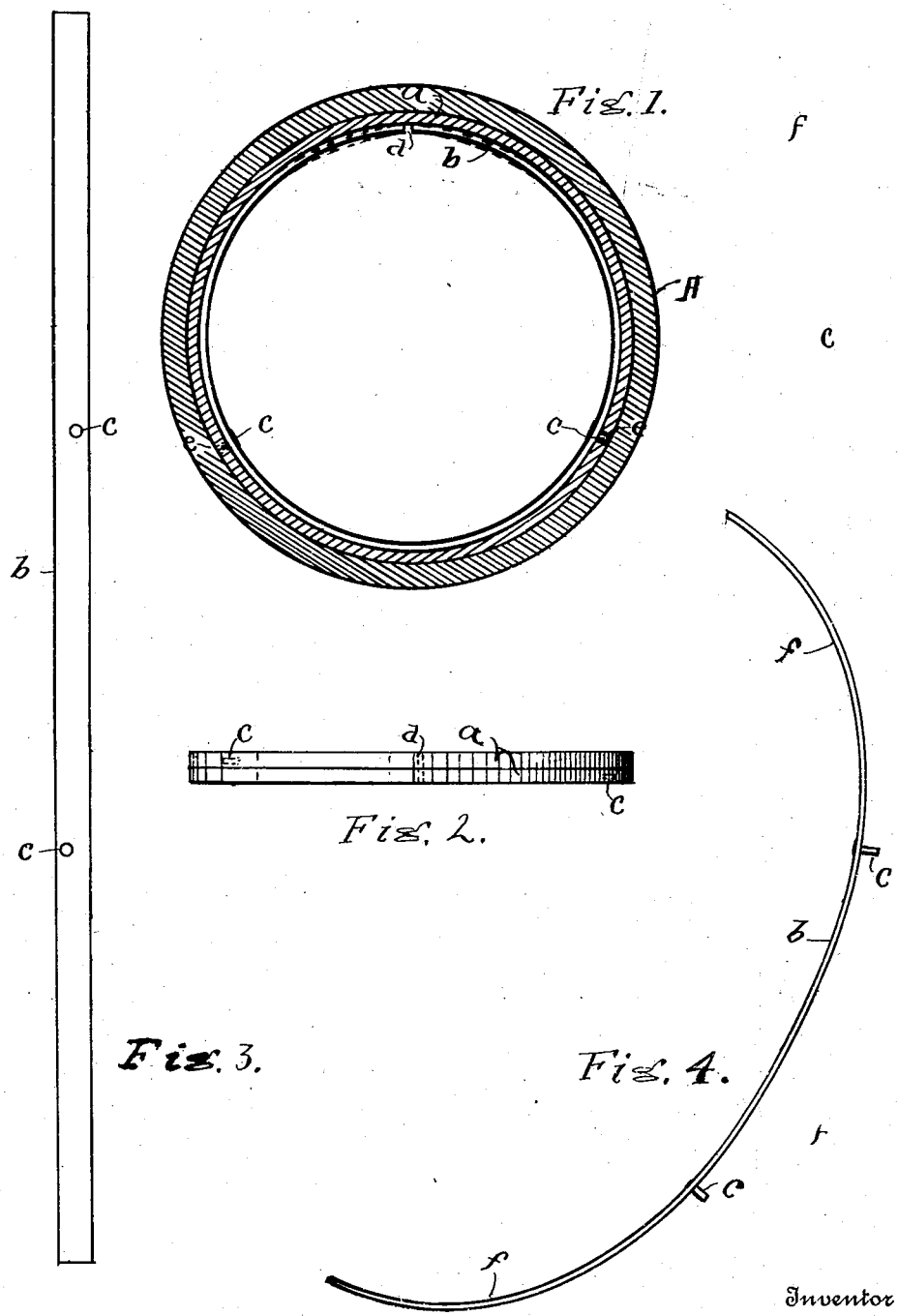

C. E. JOHNSON.
PISTON RING CONSTRUCTION.
APPLICATION FILED DEC. 5, 1913.

1,172,461.

Patented Feb. 22, 1916.

Witnesses

Inventor
Charles E. Johnson
By Ithiel J. Cilley
Attorney

UNITED STATES PATENT OFFICE.

CHARLES E. JOHNSON, OF MUSKEGON, MICHIGAN.

PISTON-RING CONSTRUCTION.

1,172,461.　　　Specification of Letters Patent.　　Patented Feb. 22, 1916.

Application filed December 5, 1913. Serial No. 804,949.

*To all whom it may concern:*

Be it known that I, CHARLES E. JOHNSON, a citizen of the United States, residing at Muskegon, in the county of Muskegon and State of Michigan, have invented certain new and useful Improvements in Piston-Ring Construction, of which the following is a specification.

My invention relates to improvements in the piston ring construction in gas engines, steam engines, compressors, pumps, &c. and its objects are, first, to provide a means whereby the inner ring will cause the outer rings to exercise an even and uniform pressure on all parts of the inner surface of the cylinder throughout its peripheral area as it travels longitudinally of the cylinder; second, to provide a means whereby the outer rings will be held in position so they cannot creep revolubly on the inner ring and thus bring the partings in the outer rings together, or in conjunction with the parting in the inner ring and form an opening for the passage of steam or gas through the rings to the opposite side of the piston, and, third, to provide a practically unbreakable inner ring for piston ring construction.

I attain these objects by the mechanism and construction shown in the accompanying drawing in which—

Figure 1 is a side elevation of the assembled rings forming one complete piston ring. Fig. 2 is an edge view of the same. Fig. 3 is a face view of the inner ring extended, and, Fig. 4 is an edge view of the same showing the approximate form of the ring before being applied to the piston between the piston head and the outer rings.

Similar letters refer to similar parts throughout the several views.

In the construction of the inner ring I use a very high grade of flexible spring steel ribbon $b$, which is curved as necessary for various sized pistons, to avert the danger of uneven and improper pressure upon the outer rings, particularly at and near the ends of the ring. With the ends of this ring left straight, or upon the regular normal curve of the body of the ring they would, when compressed to place by the outer rings, in the piston construction, assume practically the form indicated by the dotted lines in Fig. 1, and thus destroy the unity of pressure upon the outer rings to such an extent as to destroy the uniformity of pressure in the cylinder and thus render the action of the rings very undesirable; hence I find it necessary to curve the ends upon shorter radius and upon an irregular curve, as indicated at $f$ $f$, so that when they are compressed within the outer rings in the piston construction an exact and uniform pressure will be exercised the entire length of the rings.

To avert the danger of the outer rings $a$ $a$ creeping on the inner ring, revolubly, and rendering it possible for the openings $e$ $e$ in the outer rings to come opposite each other, or of bringing them, or one of them over the opening $d$ in the inner ring and thus forming a passageway for gas, steam or other substance in the cylinder, I place two small pins in the inner ring, as indicated at $c$ $c$, properly located to hold the several rings in proper relative positions to form and retain the desired laps in the ring construction.

It will be readily understood that with the several rings constructed and applied as hereinbefore described, it will be possible to use these improved piston rings until the outer rings $a$ $a$ are very nearly worn through, without any danger of leakage through or past the rings on the piston, as the great elasticity of the inner ring, and the even distribution of its expansive force or pressure upon the outer rings will cause the outer rings to bear uniformly around the inner surface of the cylinder throughout the entire area of their surfaces, thus insuring close fitting joints between the inner ring and the outer rings, and between the outer rings and the surface of the cylinder at all times. In this manner I am enabled to provide a piston ring that has far greater lasting qualities than could possibly be attained with an ordinary inelastic inner ring.

A, in Fig. 1, represents a cross section of a cylinder in which my rings are to be worked, entered for the purpose of showing the proper application of the rings.

What I claim as new, and desire to secure by Letters Patent of the United States, is:—

1. In combination with a piston head and a cylinder, an assembled packing ring consisting of two cast iron outer rings divided at a given point, in combination with an inner ring made of spring steel ribbon curved irregularly to a proper degree to insure a perfectly uniform pressure its entire length when compressed to a perfect annular form and confined within the outer rings.

2. In combination with a cylinder and a piston therein, an assembled packing ring consisting of two cast iron outer rings machined to the exact diameter of the cylinder and open at a given point to allow of expansion, in combination with an inner ring made of spring steel ribbon curved irregularly to a proper form to be compressed to perfect annular form and placed inside the outer rings and insure perfectly uniform pressure the entire diameter of the rings between the inner ring and the outer rings and between the outer rings and the surface of the cylinder, and pins projecting from the outer surface of the inner ring in position to pass into the openings in the outer rings to hold said several rings in exact relative position with each other.

Signed at Muskegon Michigan November 11th 1913.

CHARLES E. JOHNSON.

In presence of—
GEORGE D. VANDERWERP,
CHRIS SCHOUR.